Figure 1:
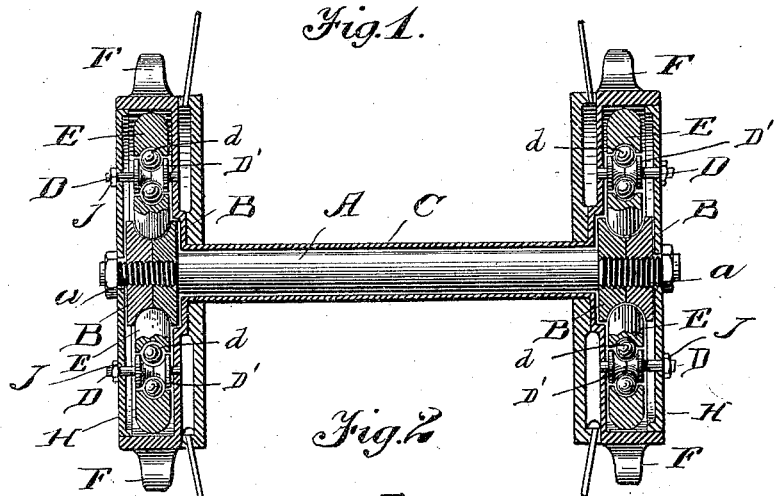

No. 608,709. Patented Aug. 9, 1898.
R. G. PETWAY.
ROLLER BEARING.
(Application filed Aug. 7, 1896.)

(No Model.)

WITNESSES
Edmund A. Strause.
N. S. Hockman.

INVENTOR
Robert G. Petway
by John Wedderburn
Attorney

UNITED STATES PATENT OFFICE.

ROBERT G. PETWAY, OF NASHVILLE, TENNESSEE.

ROLLER-BEARING.

SPECIFICATION forming part of Letters Patent No. 608,709, dated August 9, 1898.

Application filed August 7, 1896. Serial No. 602,062. (No model.)

*To all whom it may concern:*

Be it known that I, ROBERT G. PETWAY, a citizen of the United States, residing at Nashville, in the county of Davidson and State of Tennessee, have invented certain new and useful Improvements in Roller-Bearings for Bicycles and other Wheeled Vehicles; and I do hereby declare the following to be a full, clear, and exact description of the invention, such as will enable others skilled in the art to which it appertains to make and use the same.

This invention relates to antifriction-bearings designed generally for use on vehicles and specifically for use on bicycles and other foot-propelled vehicles.

The primary object of the invention is to reduce friction to a minimum and provide a simple and cheap construction of roller-bearing the several parts of which may be readily disassociated and reassembled, thus adapting the same to easy repair and cleansing.

Other objects and advantages of the invention will appear in the course of the subjoined description.

The invention consists in certain novel features and details of construction and arrangement of parts, as hereinafter fully described, illustrated in the drawings, and incorporated in the claims hereto appended.

Figure 2:
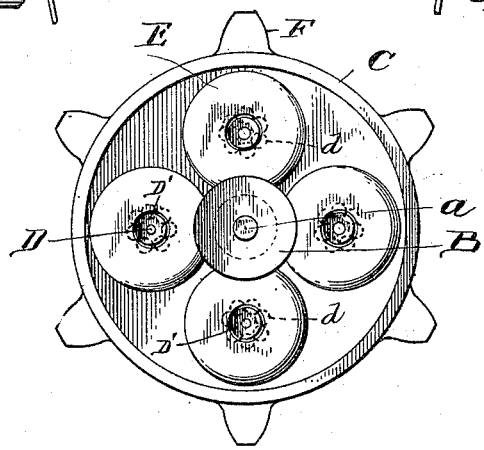
Figure 3:
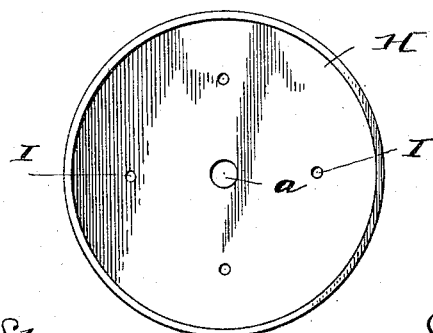

In the accompanying drawings, Figure 1 is a longitudinal section through a wheel-hub, showing the improved bearing constructed in accordance with this invention. Fig. 2 is a side view of the bearing with the adjacent inclosing cap removed. Fig. 3 is an inside face view of the cap.

Similar letters of reference designate corresponding parts in the several figures of the drawings.

Referring to the drawings, A designates an axle which is ordinarily stationary, the drawings illustrating a construction particularly designed for use in connection with the wheels of bicycles. The axle A has its ends reduced and threaded, as at $a$, to receive two sets of cones B, one set being employed at each end of the axle and each set comprising two cones which are disposed reversely to each other, so as to leave a V-shaped channel in which the antifriction-rollers travel.

The hub C surrounds the axle A and is provided at its ends with flanges having rims on the outer surfaces of which are sprocket-teeth F to receive suitable drive-chains. Between said flanges and extending around the hub C are spoke-receiving flanges, which are preferably secured rigidly either to the hub C or to the flanges at the end thereof or to both.

D represents a series of stud-axles the inner ends of which are resecured in the hub-flange and the outer ends of which extend through a cap H. Upon each axle D is mounted a pair of cones D', disposed reversely to each other, upon which travel series of antifriction-balls $d$, said balls also traveling within the channeled center of a series of antifriction-rollers or wheels E, which in turn travel around the cones B.

The caps H are provided with central openings to receive the reduced ends $a$ of the axle and are secured in place by nuts on the end of said axle. Other nuts J are placed upon the projecting ends of the stud-axles D, thus assisting in securing the caps H in place and also serving to steady the movable parts of the bearing. Each cap H is provided with a peripheral inwardly-extending flange which bears against the inner surface of the toothed rim.

From the foregoing description it will be seen that the cones may be adjusted with relation to each other for taking up wear in the bearing. Should wear take place between the rollers E and cones B, the cones B may be adjusted to compensate therefor. Should wear take place between the antifriction-balls and the rollers, the smaller cones may be adjusted so as to compensate therefor. The small cones D' may be rendered adjustable by threading them upon the stud-axles similarly to the larger cones B. It will also be observed that the axles D are supported at both ends, and the strain and weight thereon are thus equalized, causing the balls and rollers to wear evenly at all points.

While the improved bearing is described and illustrated with especial reference to bicycle-wheels, it is to be distinctly understood that the invention is not to be limited to such use, as the improvements are equally applicable to vehicle-wheel hubs and axles and at various other points where it is desired to reduce friction to a minimum. The construction is itself susceptible to changes in form, proportion, and minor details, which may accordingly be resorted to without departing from the principle or sacrificing any of the advantages of the invention.

Having thus described the invention, what is claimed as new, and desired to be secured by Letters Patent, is—

1. A threaded axle, and cones adjustable thereon, in combination with a hub, flanges thereon, a rim at the periphery of each flange, stud-axles projecting from said flanges, cones thereon, balls on the cones, and a series of antifriction-rollers on said balls and traveling around in contact with the cones on the main axle, substantially as described.

2. In an antifriction-bearing, an axle, sets of cones thereon, one of each set being adjustable, in combination with a hub, flanges thereon, a rim at the periphery of each flange, stud-axles connected to said flanges, rollers thereon and traveling around in contact with said cones, and caps fitted to the rims and adapted to receive and aid in supporting said stud-axles, substantially as described.

3. In an antifriction-bearing, an axle and cones thereon, in combination with a hub, flanges thereon and detachable caps forming inner and outer walls, stud-axles supported in said walls, and antifriction-rollers on said stud-axles and traveling around in contact with the cones on the main axle, substantially as described.

4. In an antifriction-bearing, an axle, and cones thereon, in combination with a hub, rigidly-attached flanges thereon, a rim at the periphery of each flange, stud-axles projecting from said flanges, antifriction-rollers on said axles and traveling around in contact with said cones, caps fitted to said flanges and having openings to receive said stud-axles, and securing means for holding said caps in place, substantially as described.

In testimony whereof I have signed this specification in the presence of two subscribing witnesses.

ROBERT G. PETWAY.

Witnesses:
GEORGE LINGNER,
W. J. DAVY.